United States Patent
Chien

(10) Patent No.: US 12,014,875 B2
(45) Date of Patent: Jun. 18, 2024

(54) MINIATURIZATION PROCESS OF PASSIVE COMPONENT

(71) Applicant: TRUSVAL TECHNOLOGY CO., LTD., Miaoli County (TW)

(72) Inventor: Shih-Pao Chien, Miaoli County (TW)

(73) Assignee: Trusval Technology Co., Ltd., Miaoli County (TW)

( * ) Notice: Subject to any disclaimer, the term of this patent is extended or adjusted under 35 U.S.C. 154(b) by 329 days.

(21) Appl. No.: 17/497,154

(22) Filed: Oct. 8, 2021

(65) Prior Publication Data
US 2023/0114576 A1    Apr. 13, 2023

(51) Int. Cl.
*H01G 4/002*    (2006.01)

(52) U.S. Cl.
CPC .................. *H01G 4/002* (2013.01)

(58) Field of Classification Search
CPC ........ H01G 4/002; H01G 4/005; H01G 13/04; H01G 9/004; H01L 24/80; H01L 2224/2919
See application file for complete search history.

(56) References Cited

U.S. PATENT DOCUMENTS

| | | | |
|---|---|---|---|
| 6,555,487 B1 * | 4/2003 | Weimer | H01L 28/91 438/762 |
| 2003/0183339 A1 * | 10/2003 | Sasaoka | H01L 21/6838 156/345.31 |

* cited by examiner

*Primary Examiner* — Robert A Vetere
(74) *Attorney, Agent, or Firm* — Rosenberg, Klein & Lee

(57) ABSTRACT

A miniaturization process of passive electronic components is revealed. The miniaturization process mainly includes the steps of reforming, reacting at high temperature, preparing paste, dipping in the paste, light curing, packaging, heat curing, cutting pins, coating silver paste, heating and drying, and engraving by laser. The miniaturization process makes production of the passive components with thinner, smaller, and lightweight deign easier and the more convenient. The service life of the passive components is also extended and applications of the passive components are broader.

32 Claims, 2 Drawing Sheets

MINIATURIZATION PROCESS OF PASSIVE COMPONENT

BACKGROUND OF THE INVENTION

Field of the Invention

The present invention relates to a miniaturization process of passive components, especially to a miniaturization process of passive components which makes production of the passive components with thinner, smaller, and lightweight deign easier and the more convenient. The passive components produced also have longer service life and more applications.

Description of Related Art

In order to meet the increasing demand for smaller, thinner, and lightweight consumer electronics with high performance, higher-density design per unit area with enhanced miniaturization of components such as passive components are needed. Thus the quality requirements for passive components are getting higher yearly.

Generally, a passive component is an electronic component which can absorb, store and/or dissipate energy, but no power gain such as capacitors, inductors, resistors, etc. In most of the circuit, the passive components are connected to active components to form a complete circuit.

Although the above passive components are widely applied to circuit with expected functions, the production process of the passive components are more difficult and complicated due to requirements for compact volume and lightweight design of the passive components. Thus there is room for improvement and there is a need to provide a novel miniaturization process of passive components.

SUMMARY OF THE INVENTION

Therefore, it is a primary object of the present invention to provide a miniaturization process of passive components which makes production of the passive components with thinner, smaller, and lightweight deign easier and the more convenient. The service life of the passive components is also extended and applications of the passive components are wider.

In order to achieve the above object, a miniaturization process of passive components according to the present invention includes the steps of reforming, reacting at high temperature, preparing paste, dipping in the paste, light curing, packaging, heat curing, cutting pins, coating silver paste, heating and drying, and engraving by laser.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

In order to learn technical content, purposes and functions of the present invention more clearly and completely, please refer to the following detailed descriptions, figures and reference signs.

Figure 1:
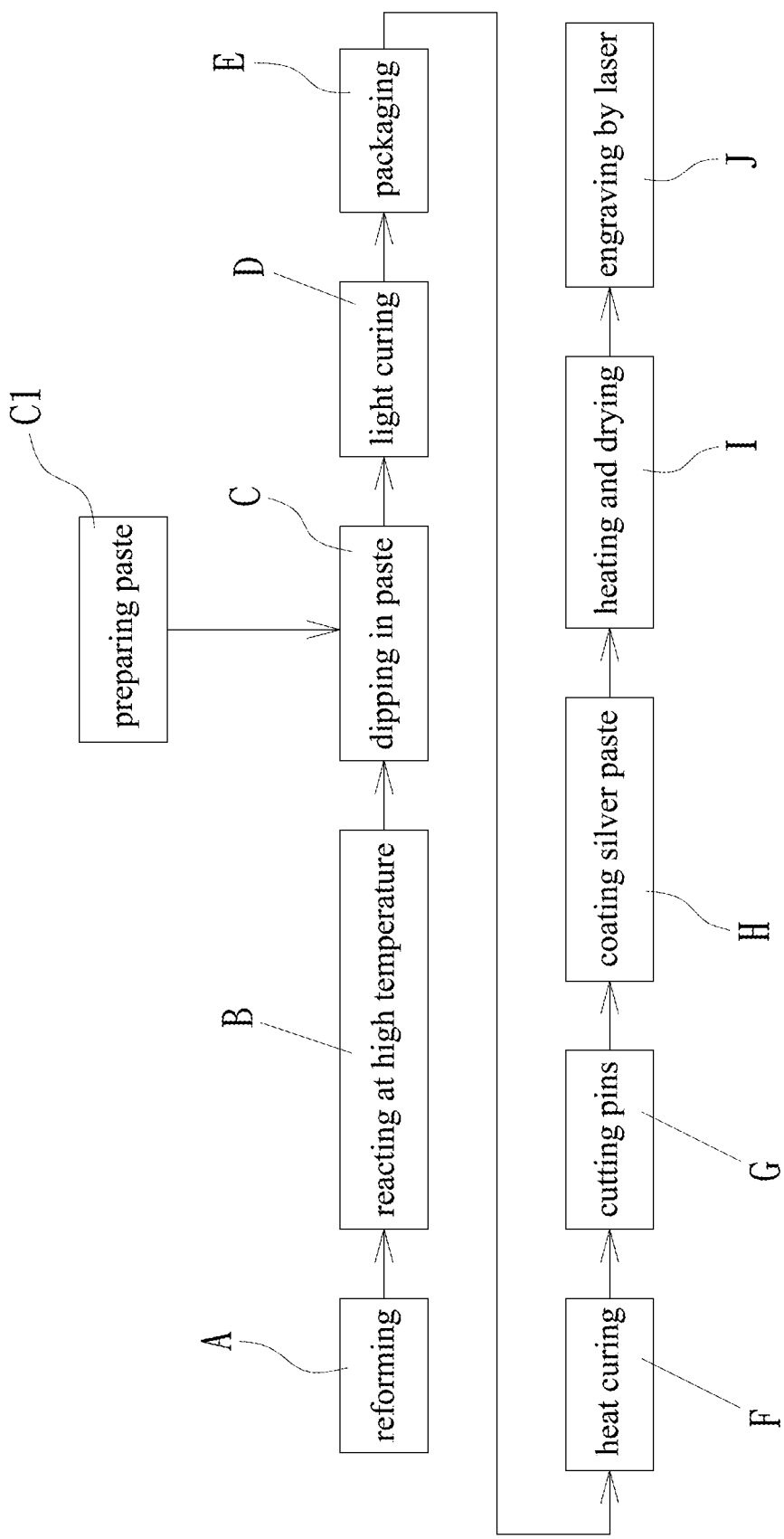
FIG. 1 is a flow chart showing steps of an embodiment according to the present invention.
Figure 2:
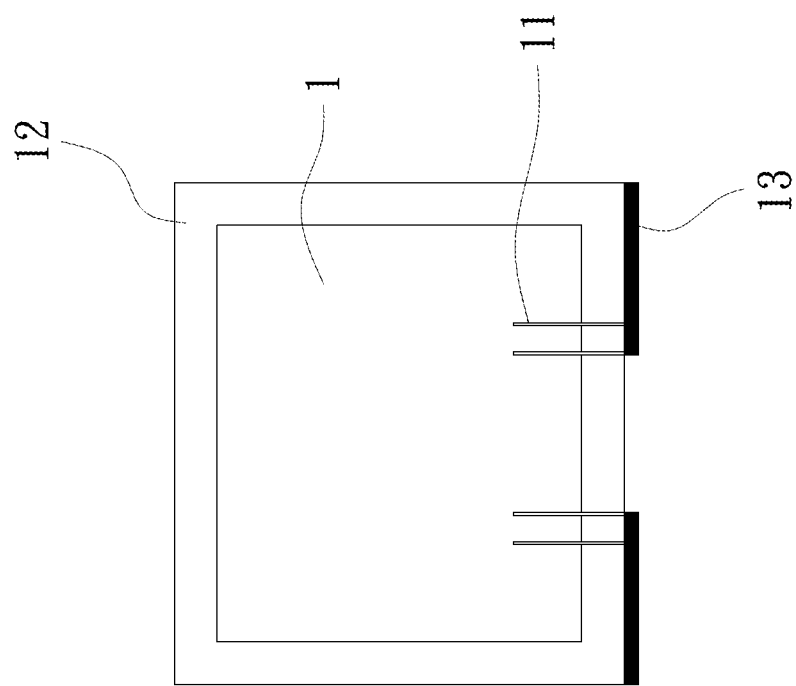
FIG. 2 is a schematic drawing structure of products of an embodiment according to the present invention.

Refer to FIG. 1 and FIG. 2, a miniaturization process of passive electronic components which is composed of the following steps is revealed.

A. reforming: place a capacitor element 1 connected with electrode pins 11 into a reforming tank. Ultra-high concentrated hydrogen peroxide solution in which at least 10% hydrogen peroxide gas and carbon dioxide gas are dissolved is used as an oxidizing agent and a current is applied for repairing reoxidation and oxidation of the capacitor element 1. The electrode pins 11 are also oxidized and a length of the oxidized electrode pins 11 projecting from an edge of the capacitor element 1 is over 0.2 mm while 0.4 mm is preferred.

B. reacting at high temperature: apply high temperature to the capacitor element 1 already reformed after the step A to react completely and release gas. The high temperature is at least 150° C. and preferably ranging from 180° C. to 250° C.

C1. preparing paste: prepare a composite material including flexible epoxy as main agent and micro-scale and nanoscale thermal conductive layered materials with high insulation and gas barrier properties by in situ composition, then mix the composite material with a curing agent at adequate curing temperature homogeneously in a vacuum chamber to form a composite paste. The curing temperature is at least 50° C. and 90° C. is optimal.

C. dipping in paste: pump the composite paste prepared in the step C1 to an impregnation tank and dip the capacitor element 1 in the composite paste with a viscosity of 3000-4500 CPS (centipoise). Remove redundant composite paste with air or inert gas such as argon so that a surface of the capacitor element 1 is covered with the composite paste homogeneously.

D. light curing: move the capacitor element 1 into a processing tank with a vacuum pump device and a light curing device for vacuum pumping and light curing of the composite paste on the capacitor element 1 after the step C. Thereby the composite paste is cured and a thickness of the composite paste is at least 0.02 mm and 0.08 mm is preferred.

E. packaging: place the capacitor element 1 on at least one truss after the step D and there can be a plurality of trusses arranged in arrays. Then move the truss into a corresponding mold, and perform injection molding of plastic under high temperature and high pressure by a multi-screw injection molding machine for forming a plastic packaged surface 12 covering the capacitor element 1. During the injection molding of the plastic, a temperature used is at least 150° C. and 180° C. is preferred while a pressure used is at least 50 kg/cm$^2$ and 90-105 kg/cm$^2$ is preferred. A thickness of the plastic packaged surface 12 injected is at least 0.1 mm and 0.4 mm is preferred. The plastic used is highly filled micro-scale and nano-scale materials with high temperature resistance (at least 250° C.), high gas barrier property, high mechanical strength, high thermal conductivity, and high electromagnetic wave absorption.

F. heat curing: move the capacitor element 1 to a processing tank with a vacuum pump device and a high temperature heater for being treated by vacuum pumping and high temperature heating after the step E. A vacuum pressure of the vacuum pumping is at least 0.1 Pa and 0.1 MPa is preferred while a temperature of the high temperature heating is at least 150° C. and 180° C.-250° C. is preferred. The heating process is in a gradient heating mode and each temperature gradient of 20° C. is kept for at least 2 hours.

G. cutting pins: take out the capacitor element 1 after the step F, and then remove the electrode pins 11 projecting from the plastic packaged surface 12 by cutting.

H. coating silver paste: coat silver paste 13 which is rich in nickel and tin on positions where the electrode pins 11 are removed by cutting. The silver paste 13 extends from the electrode pins 11 on an anode and a cathode to edges of two sides of the plastic packaged surface 12. A thickness of the silver paste 13 is at least 0.03 mm and 0.1 mm is preferred while a width of the silver paste 13 is at least 0.1 mm and 3 mm is preferred.

I. heating and drying: heat and dry the silver paste 13. Also perform laser welding on positions where the electrode pins 11 are in contact with the silver paste 13.

J. engraving by laser: engrave words or symbols for recognition on the plastic packaged surface 12 by laser. Thereby the miniaturization process is completed.

Thus the device produced by the present process can be disposed on various types of printed circuit while in use. Therefore, not only circuit operation is achieved, compact and lightweight design for miniaturization of passive components is also attained. The device also has longer service while in use and thus has more applications.

In summary, compared with techniques available now, the present process makes production of the passive components with thinner, smaller, and lightweight deign easier and the more convenient. The service life of the passive components is also extended so that applications of the passive components are broader.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A miniaturization process of passive electronic components comprising the steps of:
    A. reforming: placing a capacitor element connected with electrode pins into a reforming tank, using a hydrogen peroxide solution as an oxidizing agent, and applying a current for repairing reoxidation and oxidation of the capacitor element while the electrode pins are oxidized;
    B. reacting at high temperature: applying high temperature to the capacitor element already reformed after the step A to continue the oxidation reaction and release gas;
    C1. preparing paste: preparing a composite material including flexible epoxy used as main agent and microscale and nanoscale thermal conductive layered materials with high insulation and gas barrier properties by in situ composition, then mixing the composite material with a curing agent at adequate curing temperature homogeneously in a vacuum chamber to form a composite paste;
    C. dipping in paste: pumping the composite paste prepared in the step C1 to an impregnation tank, dipping the capacitor element in the composite paste, and removing redundant composite paste with gas so that a surface of the capacitor element is covered with the composite paste homogeneously;
    D. light curing: moving the capacitor element into a processing tank with a vacuum pump device and a light curing device for vacuum pumping and light curing of the composite paste on the capacitor element after the step C so that the composite paste is cured;
    E. packaging: placing the capacitor element on at least one truss after the step D, moving the truss into a corresponding mold, and performing injection molding of plastic under high temperature and high pressure for forming a plastic packaged surface covering the capacitor element;
    F. heat curing: moving the capacitor element to a processing tank with a vacuum pump device and a high temperature heater for being treated by vacuum pumping and high temperature heating after the step E;
    G. cutting pins: taking out the capacitor element after the step F, then removing the electrode pins projecting from the plastic packaged surface by cutting;
    H. coating silver paste: coating silver paste on positions where the electrode pins are removed by cutting and allowing the silver paste to extend from the electrode pins on an anode and a cathode to edges of two sides of the plastic packaged surface;
    I. heating and drying: heating and drying the silver paste and performing laser welding on positions where the electrode pins are in contact with the silver paste; and
    J. engraving by laser: engraving words or symbols for recognition on the plastic packaged surface by laser to complete the miniaturization process.

2. The process as claimed in claim 1, wherein at least 10% hydrogen peroxide gas and carbon dioxide gas are dissolved in the hydrogen peroxide solution in the step A.

3. The process as claimed in claim 1, wherein a length of the oxidized electrode pins projecting from an edge of the capacitor element is over 0.2 mm in the step A.

4. The process as claimed in claim 1, wherein a length of the oxidized electrode pins projecting from an edge of the capacitor element is 0.4 mm in the step A.

5. The process as claimed in claim 1, wherein the high temperature being applied to the capacitor element is at least 150° C. in the step B.

6. The process as claimed in claim 1, wherein the high temperature being applied to the capacitor element is ranging from 180° C. to 250° C. in the step B.

7. The process as claimed in claim 1, wherein the curing temperature of the curing agent in the step C1 is at least 50° C.

8. The process as claimed in claim 1, wherein the curing temperature of the curing agent in the step C1 is 90° C.

9. The process as claimed in claim 1, wherein a viscosity of the composite paste in the step C is 3000-4500 CPS.

10. The process as claimed in claim 1, wherein the gas used in the step C is selected from the group consisting of air and inert gas.

11. The process as claimed in claim 1, wherein a thickness of the composite paste in the step D is at least 0.02 mm.

12. The process as claimed in claim 1, wherein a thickness of the composite paste in the step D is 0.08 mm.

13. The process as claimed in claim 1, wherein a plurality of trusses arranged in arrays is used in the step E.

14. The process as claimed in claim 1, wherein a multi-screw injection molding machine is used to perform the injection molding of the plastic under high temperature and high pressure in the step E.

15. The process as claimed in claim 1, wherein a temperature of the injection molding of the plastic in the step E is at least 150° C.

16. The process as claimed in claim 1, wherein a temperature of the injection molding of the plastic in the step E is 180° C.

17. The process as claimed in claim 1, wherein a pressure of the injection molding of the plastic in the step E is at least 50 kg/cm².

18. The process as claimed in claim 1, wherein a pressure of the injection molding of the plastic in the step E is 90-105 kg/cm².

19. The process as claimed in claim 1, wherein a thickness of the plastic packaged surface injected in the step E is at least 0.1 mm.

20. The process as claimed in claim 1, wherein a thickness of the plastic packaged surface injected in the step E is 0.4 mm.

21. The process as claimed in claim 1, wherein the plastic in the step E is highly filled micro-scale and nano-scale materials with high temperature resistance, high gas barrier property, high mechanical strength, high thermal conductivity, and high electromagnetic wave absorption.

22. The process as claimed in claim 1, wherein the plastic in the step E is resistant to a temperature of at least 250° C.

23. The process as claimed in claim 1, wherein vacuum pressure of the vacuum pumping in the step F is at least 0.1 Pa.

24. The process as claimed in claim 1, wherein vacuum pressure of the vacuum pumping in the step F is 0.1 MPa.

25. The process as claimed in claim 1, wherein a temperature of the high temperature heating in the step F is at least 150° C.

26. The process as claimed in claim 1, wherein a temperature of the high temperature heating in the step F is 180° C.-250° C.

27. The process as claimed in claim 1, wherein the high temperature heating is in a gradient heating mode and each temperature gradient of 20° C. is kept for at least 2 hours in the step F.

28. The process as claimed in claim 1, wherein the silver paste in the step H is rich in nickel and tin.

29. The process as claimed in claim 1, wherein a thickness of the silver paste in the step H is at least 0.03 mm.

30. The process as claimed in claim 1, wherein a thickness of the silver paste in the step H is 0.1 mm.

31. The process as claimed in claim 1, wherein a width of the silver paste in the step H is at least 0.1 mm.

32. The process as claimed in claim 1, wherein a width of the silver paste in the step H is 3 mm.

* * * * *